United States Patent [19]
Black

[11] 3,930,330
[45] Jan. 6, 1976

[54] OUTRIGGER FISHING LINE RELEASE CLIP

[76] Inventor: Albert David Black, P. O. Box 3172, Marathon Shores, Fla. 33052

[22] Filed: Jan. 31, 1975

[21] Appl. No.: 546,100

[52] U.S. Cl.................. 43/17; 24/115 F; 43/43.12
[51] Int. Cl.².................................... A01K 97/12
[58] Field of Search............ 43/17, 43.12; 24/115 F, 24/201 TR

[56] References Cited
UNITED STATES PATENTS

| | | | |
|---|---|---|---|
| 2,170,594 | 8/1939 | Nicholson | 43/17 |
| 2,749,648 | 6/1956 | Schneider | 43/17 |
| 3,026,646 | 3/1962 | Weaver | 43/43.12 |
| 3,077,048 | 2/1963 | Strumpf | 43/43.12 |
| 3,816,954 | 6/1974 | Bissonette | 43/43.12 |

Primary Examiner—Louis G. Mancene
Assistant Examiner—Daniel J. Leach
Attorney, Agent, or Firm—Malin & Haley

[57] ABSTRACT

An outrigger clip for use in releasably securing a fishing line to the run-out line on an outrigger pole, the clip being constructed to reduce or eliminate fouling of the fishing line. The body and clip release arm are constructed so that the clip, when in use, will have a tendency to hang from the outrigger line instead of twisting, which causes fouling of the fishing line. The clip body itself is smooth about the edges so that any contact with a fishing line caused by slack or the like will prevent or prohibit snagging or fouling of the fishing line about the clip body itself. The clip includes a fishing line release arm with an adjustable tensioning means and an outrigger attaching wire disposed through the clip body at such a position to place the center of gravity of the body away from the attaching wire and the outrigger line.

2 Claims, 3 Drawing Figures

OUTRIGGER FISHING LINE RELEASE CLIP

BACKGROUND OF THE INVENTION

This invention relates generally to an outrigger fishing line release clip, and specifically to a clip which engages and holds a fishing line to the pay-out line on an outrigger pole, the clip providing predetermined tensioning for holding the fishing line such that when the line is hit by a fish, the clip will release the fishing line from the outrigger.

The use of release clips for fishing lines on outrigger poles is well known. Release clips shown in the prior art have several drawbacks and have had problems with the fishing line being fouled in the outrigger line and the clip itself. Oftentimes, due to wind conditions or the movement of the boat, the tension on the fishing line itself will vary such that a slack condition has in the past resulted in the tangling or twisting of the fishing line about the clip body. Another problem that has been encountered is that when paying out the outrigger line, the outrigger line will often twist or spin as it is being wound through the outrigger guide. This spinning action of the outrigger line causes the clip itself to spin. The fishing line attached to the clip will then become twisted in the clip and the outrigger line, fouling and preventing a clean release of the line. Swivels have been employed at the ends of the clips in an effort to alleviate this problem but have not totally done the job because of variable tension on the fishing line and corrosion of the swivel mechanism, which prevents the swivel from working properly. The instant invention overcomes these problems of the prior art by providing an offset center of gravity pivot axis along one of the sides of the clip body which when the body is attached to the outrigger line tends to have the clip hang instead of twist. The shape of the clip body and the arrangement of the fishing line releasable arm which has an adjustable tension means is contoured to eliminate and reduce entangling protrusions. The clip also includes a freely rotatable outrigger line attaching wire which allows the clip body to hang in one plane, even though the attaching wire itself may spin. The fishing line release arm has an adjustable tensioning feature so that any particular tension may be utilized with the clip.

BRIEF DESCRIPTION OF THE INVENTION

An outrigger fishing line release clip is disclosed having a resilient body, the body having a longitudinal channel disposed therethrough for receiving an outrigger attaching wire, said channel being disposed adjacent one lateral side of said body. A release arm groove is disposed on the opposite side of said body along the opposite lateral edge surface. The release arm is pivotally disposed and connected at one end to said body within said groove portion, said arm being moveable from a first position to a second position relative to said body. The body includes, along an upper edge, bifurcated engaging arms disposed along the top portion, said arms being engageable with the free end of the fish line release arm when the fish line release arm is in a second locked position. A tension adjusting nut and bolt are connected through the bifurcated engaging arms and allow for the arms to be tensioned as desired. The release arm may be connected by a nut and bolt at the pivot point. The body edges are smooth and rounded, eliminating sharp pointed edge portions to reduce entanglement and engagement of the fishing line.

In operation, an outrigger attaching wire coupled to the clip body through a channel in the body is connected at each end to the outrigger line. The fish line release arm is moved to an open position and the fish line is placed therein. The tensioning means is then adjusted as desired to provide the proper tensioning on the fish line release arm. The release arm is locked and tensioned. The outrigger line is then payed out so that the fishing line is positioned where desired. Should a fish strike the fishing line, the line will be released from the clip body by the opening of the release arm.

It is an object of this invention to provide an improved outrigger fishing line release clip.

It is another object of this invention to provide a fish line release clip which is utilized with an outrigger, the clip reducing or preventing entanglement of the fishing line.

And yet another object of this invention is to provide an outrigger fish line release clip which has an adjustable tensioning means with respect to the release of the fishing line itself.

In accordance with these and other objects which will be apparent hereinafter, the instant invention will now be described with particular reference to the accompanying drawings.

PREFERRED EMBODIMENT OF THE INVENTION

Figure 1:
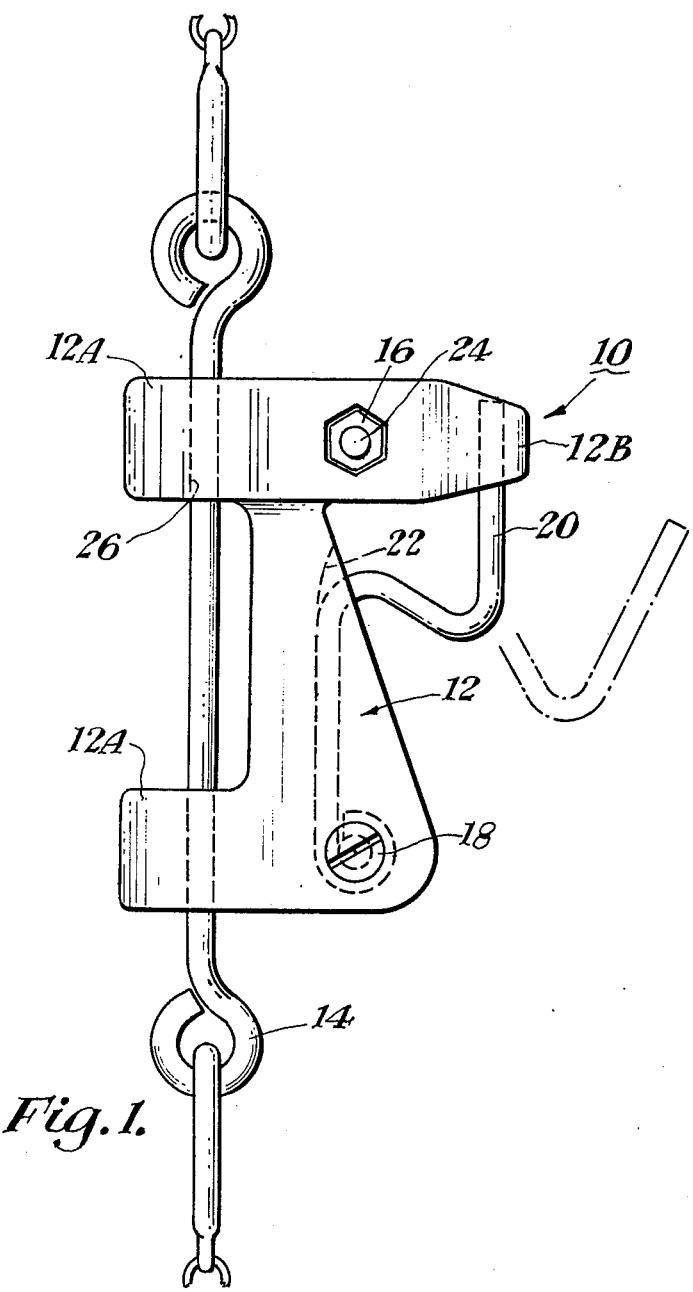
FIG. 1 shows a side elevational view of the instant invention.
Figure 2:
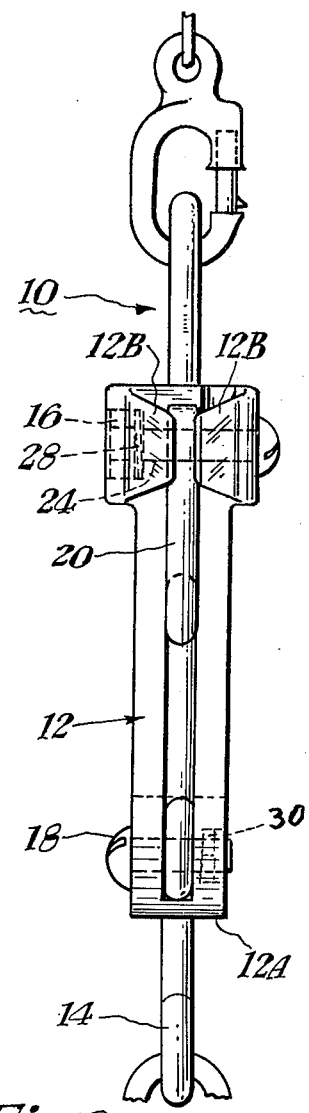
FIG. 2 shows an end elevational view of the instant invention.
Figure 3:
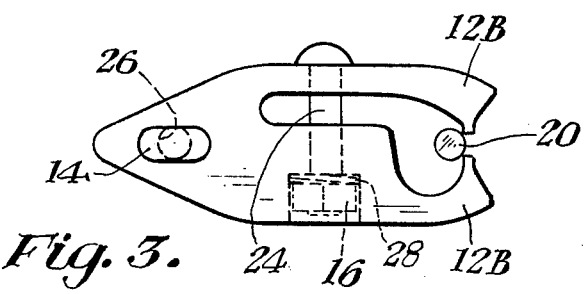
FIG. 3 shows a top plan view of the instant invention.

Referring now to the drawings and specifically FIG. 1, the instant invention is shown generally at 10 comprising a resilient body 12 which may be made in a unitary fashion of a plastic material or the like, the body 12 having the central portion with a groove 22 disposed along one lateral side and a curved release arm 20 which is connected at one end to the clip body 12 by a pivot screw 18. The screw 18 is connected to a nut 30 (FIG. 2) on the other side, the nut being disposed flush within the housing to prevent entanglement. The free end of the release arm 20 is releasably connectable between upper bifurcated arms 12B which protrude along the top portion toward one side of the body 12. Disposed through the bifurcated arms 12B is a thumb screw 24 and a nut 16, the nut being embedded within a groove within the body arm 12B to prevent rotation and to prevent the nut and screw end from protruding outside the body. A spring 28 is included for increased tensioning adjustment. The screw 24 and nut 16 constitute an adjustable tensioning screw to adjust the tension between the bifurcated arms 12B. This allows a variable magnitude of tensioning force to be placed on the release arm 20 to adjust the release tension that it takes to disengage the release arm from between the bifurcated arms 12B. Disposed on the opposite lateral side of the body 12 are second pairs of arms 12A disposed at the top and bottom which define a closed channel 26 for receiving the outrigger line attaching wire 14. The attaching wire 14 is slidably connected and disposed within the channel 26 formed by the flexible arms 12A. Thus the clip body 12 is free to slide longitudinally along the axis of the attaching wire 14 and is free to rotate about the wire. The channel 26 formed by both arms 12A may be a continuous channel through the length of the body 12. It is essential that the channel 26 is disposed adjacent one side of the device and offset from the center of gravity of the body. The clip will tend to hang in conjunction with the attaching wire rather than pivot because of the center of gravity offset.

The body portion itself is angled and the lower right hand portion is curved and protrudes forward to insure the hanging of the device while allowing it to slide freely if a fishing line engages it.

The outrigger line attaching wire 14 may have attaching eyes disposed at each end to allow a releasable clip on each end to fix the wire itself to the outrigger line. The device may also include a bell or audio means attached adjacent the open position on the release arm with which the release arm strikes, thus providing an audio signal to be emitted whenever the release arm is opened. The bell could be affixed to the bottom part of the attaching wire to allow it to be struck when the release arm moves to an open position.

By positioning channel 26, which receives the attaching wire 14 to couple the body 12 to the outrigger line, adjacent one lateral side such that the center of gravity of the body is away from the attaching wire itself while providing a free movement of the body relative to the attaching wire, the clip body with the shape shown extends the center of gravity away from the attaching wire so that it will hang while being coupled to the outrigger line which acts to stabilize the body to reduce fouling and rotation of the body. Further, the attaching wire 14 is free to rotate without rotating the clip body itself.

The overall body is streamlined to prevent snagging and to allow under water utilization by reducing the frictional flow of water about the body during trolling operations. The release clip may be utilized within or without the water or with a kite rig and other conventional rigs using an outrigger fish line release principle. Thus, the device is useable with an outrigger, down rigger or kite fishing rig.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A fishing line release clip which is attachable to an outrigger line comprising:
   a body portion, said body having a channel longitudinally disposed adjacent one side edge with the center of gravity of said body being disposed away from the axial line of said channel, said body including on the opposite side edge a bifurcated pair of arms and a lateral side groove, said bifurcated arms and groove lying in the same plane being the plane of the body itself;
   an outrigger attaching wire connected through said body channel;
   a fishing line releasing arm pivotally connected at one end within said lateral groove portion of said body with the opposite end being removeably engageable between said bifurcated arms; and
   tensioning means coupled between said bifurcated arms for providing adjustable tension force between said arms.

2. A release line clip, as in claim 1, including:
   audio alarm means connected to said attaching wire and engageable with said pivotal release arm when said release arm is moved to an open position.

* * * * *